United States Patent
Nguyen et al.

(10) Patent No.: US 6,488,808 B2
(45) Date of Patent: Dec. 3, 2002

(54) STYRENE COPOLYMERS IN DE-INKING

(75) Inventors: Duy T. Nguyen, Austin, TX (US); Charles W. Hengst, Austin, TX (US)

(73) Assignee: Huntsman Petrochemical Corporation, Austin, TX (US)

( * ) Notice: Subject to any disclaimer, the term of this patent is extended or adjusted under 35 U.S.C. 154(b) by 29 days.

(21) Appl. No.: 09/766,480

(22) Filed: Jan. 19, 2001

(65) Prior Publication Data

US 2002/0137644 A1 Sep. 26, 2002

(51) Int. Cl.[7] .................................................. D21C 5/02
(52) U.S. Cl. ................. 162/5; 162/9; 162/55; 162/158
(58) Field of Search .................. 510/278, 299, 510/340, 356, 421, 422, 426, 427, 434, 477, 488, 476; 162/5, 55, 9, 155

(56) References Cited

U.S. PATENT DOCUMENTS

| | | | | |
|---|---|---|---|---|
| 5,009,805 A | * | 4/1991 | Perner et al. ........... 252/174.24 |
| 5,102,500 A | | 4/1992 | Darlington ...................... 162/5 |
| 5,273,676 A | * | 12/1993 | Boeckh et al. .......... 252/174.21 |
| 5,413,675 A | | 5/1995 | Ikonomou et al. ............. 162/5 |
| 5,431,838 A | * | 7/1995 | Carr et al. ............. 252/174.14 |
| 5,656,646 A | * | 8/1997 | Perner et al. ................ 510/361 |
| 5,725,779 A | * | 3/1998 | Mallon et al. ............... 210/728 |
| 5,746,885 A | * | 5/1998 | Stockwell et al. .............. 162/5 |
| 5,753,604 A | * | 5/1998 | Soldanski et al. ........... 510/214 |
| 5,779,396 A | * | 7/1998 | Mallon et al. ............... 405/264 |
| 5,851,349 A | * | 12/1998 | Marwah et al. ................. 162/5 |
| 5,932,629 A | * | 8/1999 | Beck et al. .................. 523/161 |
| 6,019,855 A | * | 2/2000 | Finch et al. ................... 134/42 |
| 6,034,045 A | * | 3/2000 | Carr et al. ................... 510/361 |
| 6,187,738 B1 | * | 2/2001 | Micciche et al. ........... 510/278 |
| 6,191,083 B1 | * | 2/2001 | Brooks et al. .............. 510/124 |
| 6,207,771 B1 | * | 3/2001 | Larson ......................... 526/79 |
| 6,221,956 B1 | * | 4/2001 | Chen .......................... 524/814 |
| 6,242,405 B1 | * | 6/2001 | Lykke et al. ................ 510/321 |
| 6,258,764 B1 | * | 7/2001 | Gorlin ......................... 510/223 |
| 6,358,909 B1 | * | 3/2002 | Ochomogo et al. ......... 510/417 |
| 6,379,001 B1 | * | 4/2002 | Tomida et al. .............. 347/100 |

* cited by examiner

*Primary Examiner*—Gregory Delcotto
(74) *Attorney, Agent, or Firm*—Russ R. Stolle; Ron D. Brown; Christopher J. Whewell

(57) ABSTRACT

Provided herein are compositions of matter useful in de-inking secondary fibers. A composition according to the invention includes an aqueous solution of an anionic form of a styrene-methacrylic acid copolymer. When a surfactant is used in combination with the copolymers herein described in a de-inking operation, a synergy is observed in that the combination of copolymer and surfactant combination together yield a recycled fiber product having higher brightness level and a lower effective residual ink concentration than recycled fibers produced using either the copolymer or surfactant alone in the same operation.

10 Claims, No Drawings

STYRENE COPOLYMERS IN DE-INKING

This invention relates to compositions and methods useful for removing ink from secondary fiber within an aqueous medium. More particularly, it relates to the use of copolymers of styrene and methacrylic acid as additive agents for aqueous media in which de-inking of secondary fibers take place.

BACKGROUND

The advent of the recycling of large quantities paper in recent times has provided many benefits, including reduced de-forestation and the preservation of other resources.

As part of the recycling of paper fibers, which recycled paper fibers are commonly referred to as "secondary fibers" by those in the art, a key step is the removal of the ink which was formerly bonded to the fibers from the earlier printing present on the paper. For many years, paper was printed with oil-soluble inks which were readily removed by well-established, conventional de-inking procedures. In general terms, such procedures involve mechanically pulping used paper in an aqueous medium which contains surfactant(s), which causes removal of the ink from the paper fibers. The ink may be subsequently removed by washing or flotation.

Attendant with the increased amounts of the recycling of paper have also been several advances in printing, most notably the widespread use of the laser printer and other forms of electrophotographic copying including such methods as "inkjet", non-impact, and xerography. Papers printed in such processes pose additional problems to the recycler which are not found in recycling paper that was printed using oil-soluble or oil-based inks. The additional problems arise from the use of binders in these newer inks which are not found in the oil-soluble inks used previously. Such binders are typically polymeric materials that are thermally bonded to the paper. These types of binders are not readily dispersed by common surfactants like alkylphenol alkoxylates or alkylbenzene sulfonates. Thus, paper produced from recycled paper having electrophotographic printing thereon according to conventional de-inking methods is generally darker than that recycled from paper printed with oil-based inks, because of the much lessened degree of removal of the ink from the substrate.

The present invention provides a copolymer material which is useful in combination with surfactants employed in aqueous systems for de-inking paper fibers which are to be recycled. The copolymers of the invention function synergistically with various surfactants and provide recycled fibers having characteristics substantially similar to virgin fibers used in papermaking. Since the copolymers used in the invention are more hydrophilic and more surface active than those found in the prior art, fibers which are de-inked in accordance with the teachings of the present invention do not agglomerate ink particles but rather disperse and stabilize the ink particles, thus minimizing their tendency to become re-deposited on the fibers.

SUMMARY OF THE INVENTION

The present invention is directed at compositions of matter useful in de-inking secondary fibers. A composition according to the invention comprises an anionic form of a styrene-methacrylic acid copolymer, in which the copolymer has a styrene content of any value in the range of 10.00% to 40.00% by weight based upon the total weight of the copolymer. The molecular weight of the copolymer is preferably in the range of 1,000 to 100,000. To maintain charge balance, a composition according to the invention also includes a cation, which is preferably selected from the group consisting of: alkali metal cations, alkaline earth metal cations, ammonium ions, and alkyl-substituted ammonium ions, although any cationic species which does not detract from the performance of a composition in de-inking secondary fibers is a functional equivalent to such cations. A composition according to the invention may also comprise a surfactant, which may be cationic, anionic, or non-ionic, with non-ionic surfactants being preferred. A composition according to the invention also preferably comprises water.

The invention also includes a process for removing ink, toners, and the like from ink-bearing secondary fibers which comprises first providing an aqueous solution of an anionic form of a styrene-methacrylic acid copolymer, which preferably, though not necessarily, contains a surfactant. A fiber suspension is formed by contacting secondary fibers with said composition and maintaining such contact for an effective amount of time to cause the ink on said secondary fibers to be removed from said fibers. Finally, the ink is removed from the suspension by a method which may include flotation or washing.

DETAILED DESCRIPTION

The present invention relates to compositions useful for removing inks from secondary fibers. Compositions according to the invention comprise a water-soluble form of styrene-methacrylic acid copolymer in which the copolymer has a styrene content between about 10 and 40 per cent by weight based upon the total weight of the polymer. The preferred compositions according to the invention are aqueous solutions of an alkali metal salt of a copolymer as herein described. The copolymer can be used alone, or, more preferably, in combination with an alkoxylated fatty alcohol and/or an alkoxylated castor oil surfactant.

Styrene/Methacrylic Acid Copolymer and Water Soluble Salt Thereof

The preparation of styrene/methacrylic acid copolymers is straightforward and is known in the art. One method for preparing such copolymers useful in the present invention involves fitting a 3-necked 1L flange flask with a mechanical stirrer, heating mantle, thermometer, reflux condenser, addition inlet, and provision for maintaining an inert atmosphere within the reaction vessel, such as a nitrogen inlet. The flask is charged with three hundred thirty six (336) grams of isopropanol and one hundred twelve (112) grams of water. Heating is commenced under stirring and slow nitrogen sweep until a gentle reflux is achieved, at about 80 deg. Centigrade. A first stream comprising eighty (80) milliliters of a 5% aqueous sodium persulphate solution was slowly added to the contents of the refluxing contents of the flask simultaneously with a second stream comprising a liquid mixture of 70.4 grams of styrene and 105.4 grams of methacrylic acid, over the course of about 2 hours. Following the addition, the temperature was maintained at reflux for an additional 2 hours to ensure complete reaction. Then, an additional ten (10) milliliters of 22% sodium persulphate was added, and the temperature maintained at reflux for one additional hour to provide a styrene/methacrylic acid copolymer.

To prepare a water-soluble salt of a copolymer produced as per the above, namely the sodium salt, the flask from the above was set up for distillation by affixing a head and condenser thereto. The flask is heated until the azeotrope of isopropanol and water begins to distill, and then two hundred thirteen (213) grams of a 23% (wt.) aqueous solution of sodium hydroxide is slowly added to the flask during the distillation at a rate which is approximately equal to the rate at which the azeotrope is being distilled. The temperature of the contents of the flask are monitored, and when the temperature reaches 100–105 deg., the flask is allowed to cool to 50 degrees centigrade and the pH is adjusted to a level between about 8 and 10 using aqueous NaOH, and to a total solids content of between about 30 and 35% (wt.) as determined by evaporation of all of the water from a sample of known weight and dividing the weight of the solids remaining by the total initial weight and converting to a percentage by multiplication by 100. This procedure affords an aqueous solution comprising the sodium salt of styrene/methacrylic acid copolymer, to which may be optionally added a surfactant in order to provide a de-inking composition according to the invention.

Although the water-soluble salt of the copolymer whose preparation is described above as being the sodium salt as formed by the addition of aqueous sodium hydroxide in the final step in which the alcohol is removed by distillation, other basic substances which produce a water-soluble polymer are suitable as employment as neutralizing agents herein. Such basic substances include without limitation alkaline aqueous solutions or suspensions of other soluble metal cations, metal oxides, carbonates, etc., including without limitation, basic carbonates of any of the alkali metals, alkaline earth metals, monovalent iron, the basic oxides of any of the alkali metals or monovalent iron, ammonia, or alkyl-substituted amines including primary, secondary, and tertiary amines provided that a solution of the copolymer results after the admixture and heating. In cases where suspensions of oxides are used, a longer heating time may be necessary to effectuate solution, depending upon the particle size of the basic substance.

In the above-described method for preparing a styrene-methacrylic acid copolymer the styrene/methacrylic acid ratio is about 40:60. Copolymers of styrene and methacrylic acid having other ratios are also useful herein as the copolymer component from which a de-inking composition according to the present invention may be formed. The water-soluble forms of copolymers of styrene-methacrylic acid having any content of styrene in the range of 10.0% to 45.0%, by weight based upon the total weight of the styrene-methacrylic acid polymer, including every hundredth percentage therebetween, are suitable for use in the present invention. These polymers having varied amounts of styrene and methacrylic acid are made by altering the relative amounts of each of the components in the second stream referred to in the preparatory method above. For example, when a copolymer having a styrene to methacrylic acid ratio of 30:70 is desired, the second stream comprises 52.70 grams of styrene and 123.06 grams of methacrylic acid. When a copolymer having a styrene to methacrylic acid ratio of 20:80 is desired, the second stream comprises 31.15 grams of styrene and 140.61 grams of methacrylic acid.

The molecular weight of the copolymers produced according to a procedure such as that described above in accordance with the invention may be any molecular weight in the range of about 1,000 to about 100,000, with molecular weights having any value in the range of 1,500 to 50,000 being preferred, and with molecular weights having any value in the range of about 2,000 to about 30,000 being most preferred. The molecular weight of the final copolymer is controlled by the concentration of the initiator and the chain transfer agent, as is well known to those skilled in the art of providing copolymers produced by this method. In the present invention, the preferred chain transfer agent is isopropanol and the preferred initiator is persulfate ion. Other functionally equivalent chain transfer agents and initiators known to those skilled in the art are useful in preparing the polymers described herein.

The Surfactant Component

The present invention provides a compositions useful for de-inking secondary fibers, which compositions comprise an aqueous solution of a water-soluble form of a copolymer of styrene and methacrylic acid described above. An aqueous composition according to the present invention may also optionally include a surfactant. Any surfactant is suitable for use as an optional ingredient for inclusion in a composition according to the invention, including anionic surfactants, non-ionic surfactants, and cationic surfactants. Surfactants are well known in the chemical arts to comprise a class of materials whose molecular structures include both a hydrophilic portion and a hydrophobic portion. In addition, a surfactant molecule as a whole may carry a positive charge, negative charge, or may be electrically neutral, as is known to those skilled in the art. The number and type of surfactants known in the art is great indeed. It is most preferred that a surfactant used in a composition according to the present invention is a non-ionic surfactant. Alkoxylated oils are one class of non-ionic surfactant which are produced by reacting an alkylene oxide with an oil in the presence of a base catalyst, as such is well-known to those skilled in the surfactant arts. Generally, to produce such materials, one may use a tri-glyceride oil derived from any vegetable or animal matter in combination with one or more alkylene oxides. In cases where more than one alkylene oxide is used in the alkoxylation of an oil, the molecular structure of the resulting alkoxylated oil will contain two different alkylene oxide units. An especially preferred non-ionic surfactant suitable for use in the present invention is available from Huntsman Petrochemical Corporation of Austin, Tex. under the designation "G-5000". The amount of surfactant component present in a composition according to the invention in any amount between 0.05% and 2.00% percent by weight based upon the total weight of the fiber to be treated.

A de-inking solution according to the present invention may be used at any temperature during its use between just above freezing temperature to about 95 degrees centigrade, with about 25 degrees centigrade being preferred. The concentration of the copolymer component in a de-inking solution according to the present invention is preferably between 0.01% and 2.00% by weight based upon the total weight of the dry fiber being de-inked. More preferably, this amount is between 0.04% and 1.5%, with about 1.00% being most preferable.

In order to de-ink a quantity of secondary fiber in accordance with the present invention, one first provides an sufficient water to contain the amount of the fiber to be treated. Next, a water-soluble copolymer of styrene-methacrylic acid as described above is added to the water and mixed to provide a homogeneous solution of the copolymer in the water. This may be done by adding the copolymer itself directly to the water and mixing, or by adding an aqueous concentrate of the copolymer to the water and mixing. Next, a water-soluble surfactant may be added, and further mixing provided to yield a homogeneous solution to which the fiber that is to be de-inked is subsequently added and processed according to conventional methods. The examples given below are illustrative of the present invention and of the synergy discovered when using an alkoxylated fatty alcohol in combination with the copolymers described herein. The following abbreviations are used in the examples:

STYMMA 1—styrene methacrylic copolymer (30% styrene/70% methacrylic acid, molecular weight 17,400).
STYMMA 2—styrene methacrylic copolymer (40% styrene/60% methacrylic acid, molecular weight 12,500).
STYMAA 3—styrene methacrylic copolymer (50% styrene/50% methacrylic acid, molecular weight 57,800).
STYMMA 4—styrene methacrylic copolymer (40% styrene/60% methacrylic acid, molecular weight 22,700).
SURFONIC® L24–12—Ethoxylated linear alcohol.
CMC Carboxyl Methyl Cellulose (available from Hercules, Inc.)

EXAMPLE I

In a 4 oz. bottle were mixed 97.35 grams of tap water, 0.137 grams of 10% NaOH, and 2.0 grams of a 1% (as actives) aqueous treatment solution, wherein the actives may be any of the STYMMA copolymers, until homogeneous. Then 0.517 grams of blue security envelope shreds were added to provide a slurry. This slurry was stirred for 150 minutes at 60° C., and a paper pad was made by filtering the slurry through a small 5 cm 202 Reeve Angel filter paper. The paper pad was air-dried, and the brightness and ERIC (Effective Residual Ink Concentration) were measured using a Technibrite Micro TB-1C instrument with ERIC 950 attachment, available from Technidyne Corporation of New Albany, Ind. This instrument adheres closely to appropriate Technical Association of the Pulp and Paper Industry (TAPPI), ISO, and ASTM standards. The purpose of ERIC is to determine how much ink remains in a sample of fiber using infrared light. It is possible using light in the infrared region to isolate ink optical effects for ink present at ppm levels, other effects being invisible to IR light. The brightness is read by a calibrated blue reflectance light beam. Higher brightness and lower ERIC values indicate a more effective treatment. Results of various samples prepared and tested in accordance with this Example I using different STYMMA copolymers above are shown in Table I below:

TABLE I brightness and ERIC results on security envelope with blue ink.

| Treatment | Brightness | ERIC, ppm |
| --- | --- | --- |
| Blank (untreated) | 59.5 | 727 |
| SURFONIC ® L24-12 | 64.59 | 397 |
| STYMAA 1 | 72.2 | 228 |
| STYMMA 1/SURFONIC ® L24-12 (1:9 ratio) | 77.9 | 78 |
| STYMAA 2/SURFONIC ® L24-12 (1:9 ratio) | 77.8 | 85 |
| STYMAA 3/SURFONIC ® L24-12 (1:9 ratio) | 73.3 | 223 |
| STYMAA 4/SURFONIC ® L24-12 (1:9 ratio) | 75.7 | 176 |

The results clearly show that STYMMA 1 is more effective than SURFONIC® L24-12, as evidenced by the higher brightness value and lower ERIC value. However, it was unexpectedly found when these two are blended that a synergy results, which provides higher brightness values and lower ERIC values than either of the components provide when used alone. Surprisingly, the blend of STYMAA 1 and SURFONIC® L24-12 is far superior to that of STYMAA 3 and SURFONIC® L24-12.

EXAMPLE II

The secondary fiber used in this example was obtained from a commercial paper mill. It consisted of 33.33% security envelope, 33.33% ledger stock, and 33.33% book print. The disintegrator was used to furnish an aqueous pulp having a 5% consistency (5 % by weight of fiber with respect to the total weight of the pulp) by adding 95 parts of water and 5 grams of fibers to the disintegrator. The de-inking composition is also preferably added to the disintegrator at this stage as well. The pulp is heated to 80° C. for 30 minutes. After pulping, the stock was diluted to about 1.7% consistency and was filtered through a #20 screen to thicken the stock. The thick stock (about 15% consistency) was diluted to 0.5% consistency, after which it was filtered again to thicken the stock to about 15% consistency. The washing step was repeated one more time. Finally, about 100 g was weighed out of the diluted stock (0.5% consistency) and a paper pad was made using the same filter paper as described in the Example I. The paper pad was air-dried and brightness and ERIC were measured. Results are reported in Table II:

TABLE II brightness and ERIC results on mixed stock from commercial paper mill.

| Treatment | Dosage % | Brightness | ERIC, ppm |
| --- | --- | --- | --- |
| Untreated (blank) | 0 | 62.9 | 410 |
| SURFONIC ® L24-12 | 1 | 66.2 | 279 |
| CMC | 1 | 66.0 | 305 |
| STYMAA 1 | 1 | 71.7 | 115 |
| SURFONIC ® L24-12 | 2 | 70.6 | 143 |
| STYMAA 1 | 2 | 73.3 | 105 |
| STYMAA 1 + SURFONIC ® L24-12 (1:9 ratio) | 2 | 74.3 | 90 |

The Dosage % in table II is the amount of STYMMA copolymer present by weight based upon the total weight of the fiber being de-inked.

These results demonstrate that the use of a water-soluble form of STYMAA 1 is by itself superior to conventional de-inker surfactant, SURFONIC® L24-12, and conventional anti-redeposition agent CMC. Again, a synergy was observed when STYMAA 1 blended with SURFONIC® L24-12 was used as the de-inking agent as evidenced by the higher brightness and lower ERIC values.

It is preferred that solution according to the invention be employed in a de-inking procedure be maintained at a pH level between about 4.0 and 12.0. It is most preferred that the pH is about 7.0–10.5. The pH may be adjusted as is known to those skilled in the art using strong alkali such as alkali metal hydroxides like KOH or NaOH, or with a mineral acid such as HCl, $H_2SO_4$, etc., as required. Preferably the materials used to adjust pH levels are aqueous solutions.

Consideration must be given to the fact that although this invention has been described and disclosed in relation to certain preferred embodiments, obvious equivalent modifications and alterations thereof will become apparent to one of ordinary skill in this art upon reading and understanding this specification and the claims appended hereto. Accordingly, the presently disclosed invention is intended to cover all such modifications and alterations, and is limited only by the scope of the claims which follow.

We claim:
1. A liquid composition of matter for de-inking paper fibers which consists essentially of:
   a) a water-soluble form of a styrene-methacrylic acid copolymer having a molecular weight in the range of 1000 to 100,000, wherein said copolymer is present in any amount between 0.01% and 5.00% by weight based upon the weight of the fiber to be de-inked;
   b) a surfactant, wherein said surfactant is present in any amount between 0.01% and 5.00% by weight based upon the weight of the fiber to be de-inked; and
   c) water.
2. A composition according to claim 1 wherein the styrene content of the styrene-methacrylic acid copolymer is any value in the range of 10.00 to 40.00% by weight based upon the total weight of the copolymer, including every hundredth percentage therebetween.

3. A composition according to claim 1 wherein said water-soluble form of a styrene-methacrylic acid copolymer comprises an anionic form of said copolymer, with electrical neutrality being maintained by the presence of one or more cations selected from the group consisting of: alkali metal cations, alkaline earth metal cations, ammonium ions, or alkyl-substituted ammonium ions.

4. A composition according to claim 1 wherein said water is present in an amount of at least 90.00% by weight based upon the total weight of the composition.

5. A fiber suspension which comprises:
   a) a water-soluble form of a styrene-methacrylic acid copolymer having a molecular weight in the range of 1,000 to 100,000, wherein said copolymer is present in any amount between 0.01% and 5.00% by weight based upon the weight of the fiber;
   b) a surfactant, wherein said surfactant is present in any amount between 0.01% and 5.00% by weight based upon the weight of the fiber;
   c) water; and
   d) secondary fibers.

6. A composition of matter for de-inking of paper fibers which consists essentially of:
   a) an anionic form of a styrene-methacrylic acid copolymer, said copolymer having a styrene content of any value in the range of 10.00% to 40.00% by weight based upon the total weight of the copolymer, and wherein said copolymer has a molecular weight in the range of 1,000 to 100,000, wherein said copolymer is present in any amount between 0.01% and 5.00% by weight based upon the weight of the fiber to be de-inked;
   b) a cation selected from the group consisting of: alkali metal cations, alkaline earth metal cations, ammonium ions, and alkyl-substituted ammonium ions;
   c) a surfactant, wherein said surfactant is present in any amount between 0.01% and 5.00% by weight based upon the weight of the fiber to be de-inked; and
   d) water.

7. A composition according to claim 6 having a pH in the range of between 4.0 and 12.0.

8. A composition according to claim 6 wherein said surfactant is selected from the group consisting of: non-ionic surfactants and anionic surfactants.

9. A composition according to claim 6 wherein said surfactant is a non-ionic surfactant.

10. A composition according to claim 6 wherein said surfactant is an alkoxylated oil.

* * * * *